US011625623B2

(12) United States Patent
Neelamegam Vetharaman

(10) Patent No.: US 11,625,623 B2
(45) Date of Patent: Apr. 11, 2023

(54) SYSTEM AND METHOD FOR GENERATING A MATRIMONY RECOMMENDATION USING A MACHINE LEARNING MODEL

(71) Applicant: Gurunath Santhosh Neelamegam Vetharaman, Parsippany, NJ (US)

(72) Inventor: Gurunath Santhosh Neelamegam Vetharaman, Parsippany, NJ (US)

(*) Notice: Subject to any disclaimer, the term of this patent is extended or adjusted under 35 U.S.C. 154(b) by 691 days.

(21) Appl. No.: 16/563,899

(22) Filed: Sep. 8, 2019

(65) Prior Publication Data

US 2021/0073657 A1 Mar. 11, 2021

(51) Int. Cl.
*G06F 16/00* (2019.01)
*G06N 5/04* (2023.01)
*G06N 20/00* (2019.01)
*G06F 16/22* (2019.01)
*G06F 16/28* (2019.01)

(52) U.S. Cl.
CPC ........... *G06N 5/04* (2013.01); *G06F 16/2246* (2019.01); *G06F 16/288* (2019.01); *G06N 20/00* (2019.01)

(58) Field of Classification Search
CPC ...... G06N 5/04; G06N 20/00; G06F 16/2246; G06F 16/288
See application file for complete search history.

(56) References Cited

U.S. PATENT DOCUMENTS

| | | | | |
|---|---|---|---|---|
| 4,201,386 A | * | 5/1980 | Seale | A63F 3/0449 273/288 |
| 2004/0128148 A1 | * | 7/2004 | Austin | G06Q 30/02 705/319 |
| 2007/0030824 A1 | * | 2/2007 | Ribaudo | G01S 5/02 370/328 |
| 2010/0066822 A1 | * | 3/2010 | Steinberg | G06V 10/763 382/118 |
| 2012/0054190 A1 | * | 3/2012 | Peters | G06T 11/60 707/812 |
| 2014/0082568 A1 | * | 3/2014 | Hulet | G06F 3/04847 715/853 |
| 2015/0254311 A1 | * | 9/2015 | Lerner | G06Q 30/0269 705/14.66 |
| 2017/0124385 A1 | * | 5/2017 | Ganong | G06V 40/172 |
| 2017/0329866 A1 | * | 11/2017 | Macpherson | G16B 10/00 |
| 2020/0257707 A1 | * | 8/2020 | Folkman | G06N 20/00 |

* cited by examiner

*Primary Examiner* — Hung Q Pham

(57) ABSTRACT

A processor-implemented method for generating a matrimony recommendation using a machine learning model is provided. The method includes (i) generating a user profile for (i) a first user or (ii) a second user, (ii) obtaining family information of (a) the first user from a first user device associated with the first user and (b) the second user from a second user device associated with the second user, (iii) generating a database using the family information associated with the first user and the second user, (iv) automatically generating a first family tree using the family information associated with the first user, and a second family tree using the family information associated with the second user based on a pre-determined tree template and (v) populating family members of (a) the first family tree or (b) the second family tree based on a response from the first user or the second user.

16 Claims, 15 Drawing Sheets

FIG.3

FIRST NAME
LAST NAME
CURRENT LOCATION
MARITAL STATUS
  SINGLE       MARRIED
GENDER
  MALE         FEMALE
FAMILY NAME ← 402
HOME TOWN
DATE OF BIRTH
MORE DETAILS
[SAVE]

SYSTEM AND METHOD FOR GENERATING A MATRIMONY RECOMMENDATION USING A MACHINE LEARNING MODEL

BACKGROUND

Technical Field

Embodiments of this disclosure generally relate to determining the relationship between users and more particularly, a system and a method for generating a matrimony recommendation using a machine learning model based on a populated family tree.

Description of the Related Art

In the existing system, the information is gathered on the database and creating the family tree with respect to at least one identified individual. The computer software for gathering information related to the creation of a family tree and the computer software will search the multiple database and accessing the probability that the newly identified individual is related to the original individual. The system receiving the first profile from the first user which includes a first email address and the second email address. The second email address is associated with the second client profile. The second profile is created and the invitation is sent to the second user to update the profile. One or more relationships are associated to the first profile and the second profile to generate a family tree. One or more user interfaces is provided through which the first client provides a plurality of e-mail addresses corresponding to members of the family tree and are associated with of a plurality of profiles.

In the existing system, the family trees include a photo processing mechanism that allows cataloging and storing a user's photos and a user enters people and specifies relationships. In another system, the family tree is generated using the user profile by receiving the first profile from a first client. The users in the family are connected by receiving the first profile from a first client. The first user provides the plurality of e-mail addresses to the users in the family tree.

As mentioned above, there are several family tree sites where users can create a family tree by gathering information from the database and by manual. This portal uses a relationship machine learning algorithm that automatically generates a relationship between the new user and the family members. Also, the family tree is redrawn for each individual. Accordingly, there remains a need for an improved method and the system for connecting the current and the next generation with their immediate and extended family members and giving the matrimony suggestion to the users in the family tree.

SUMMARY

In view of the foregoing, an embodiment herein provides a processor-implemented method for generating a matrimony recommendation using a machine learning model based on a populated family tree. The processor-implemented method includes the steps of (i) generating a user profile for one or more of (a) a first user or (b) a second user, (ii) obtaining family information of (a) the first user from a first user device associated with the first user and (b) the second user from a second user device associated with the second user, (iii) generating a database using the family information associated with the first user and the second user, (iv) automatically generating (a) a first family tree using the family information associated with the first user, and (b) a second family tree using the family information associated with the second user based on a pre-determined tree template, (v) populating one or more of the first family tree members or the second family tree members based on a response from one or more of (a) the first user or (b) the second user and the family tree is populated by (a) automatically determining the relationship between family members of the first user and family members of the second user using one or more relationship rules based on the response from the first user or the second user, (b) automatically determining a degree of relationship that includes one or more of a first degree of relationship, a second degree of relationship, or a third degree of relationship between the first user and the family members of the first user or the second user and the family members of the second user and (c) automatically populating the family tree members with the determined degree of relationship between the first user and the family members of the second user and the relationship between the second user and the family members of the first user, (vi) training the machine learning model using the populated family based on the response from one or more of the first user or the second user and (vii) automatically filling the second family tree with common family members of the first family tree and the second family tree, and (viii) processing a request from a new user to generate the matrimony recommendation to the new user using the machine learning model based on the marital status of the family members of one or more first user or the second user. The user profile includes one or more of (i) a picture, (ii) an email, (iii) a first name, (iv) a last name, (v) a current location, (vi) marital status, (vii) gender, (viii) a family name, (ix) a hometown, and (x) date of birth. The family information includes one or more of family history, relationship information between family members, pictures, video or messages associated with the first user or the second user. The response includes a relationship between the first user and the second user.

In some embodiments, the processor-implemented method includes step of generating a relationship path chart that includes the relationship between each family member of one or more of the first user or the second user using the machine learning model.

In some embodiments, the pre-determined tree template includes one or more of father name and age, mother name and age, siblings name and age, maternal father name and age, maternal mother name and age, paternal father name and age or paternal mother name and age. In some embodiments, the pre-determined tree template includes at least one of spouse, at least one of Father in Law, at least one of Mother in Law, at least one of Kids and at least one of Grand Kids nodes will appeared in the family tree, when the user is married. In some embodiments, the user may view the details of the family members that includes at least one of name, age, gender, current location, home town, occupation and about family member. In some embodiments, the user may view the family tree of family members.

In some embodiments, the pre-determined tree template determines the relationship between the first user and the second user.

In some embodiments, the processor-implemented method enabling the first user or the second user to perform a plurality of actions that includes inviting at least one family friend to join a corresponding family tree friends column in at one or more the first family tree or the second family tree and inviting at one or more relative to join corresponding family tree relative column in at one or more of the first family tree or the second family tree.

In some embodiments, the processor-implemented method includes determining mutual users by processing the first family tree associated with the first user or the second family tree associated with the second user.

In some embodiments, generating the matrimony recommendation to the family members in the family trees, if the family members in the family trees includes one or more of (i) predetermined age (ii) unmarried marital status and (iii) opposite gender to unmarried family members of the family trees.

In one aspect, one or more non-transitory computer readable storage mediums storing the one or more sequences of instructions, which when executed by one or more processors, further cause a processor-implemented method for generating a matrimony recommendation using a machine learning model based on a populated family tree is provided. The processor-implemented method includes the steps of (i) generating a user profile for at least one of (a) a first user or (b) a second user, (ii) obtaining family information of (a) the first user from a first user device associated with the first user and (b) the second user from a second user device associated with the second user, (iii) generating a database using the family information associated with the first user and the second user, (iv) automatically generating (a) a first family tree using the family information associated with the first user, and (b) a second family tree using the family information associated with the second user based on a pre-determined tree template, (v) populating at least one of the first family tree or the second family tree based on a response from at least one of (a) the first user or (b) the second user and the family tree is populated by (a) automatically determining the relationship between family members of the first user and family members of the second user using one or more relationship rules based on the response from the first user or the second user (b) automatically determining a degree of relationship that comprises at least one of a first degree of relationship, a second degree of relationship, or a third degree of relationship between the first user and the family members of the first user or the second user and the family members of the second user and (c) automatically populating the family tree with the determined degree of relationship between the first user and the family members of the second user and the relationship between the second user and the family members of the first user, (vi) training the machine learning model using the populated family based on the response from at least one of the first user or the second user and (vii) automatically filling the second family tree with common family members of the first family tree and the second family tree and (viii) processing a request from a new user to generate the matrimony recommendation using the machine learning model. The matrimony recommendation is generated based on the marital status of the family members of one or more of the first user or the second user. The user profile includes one or more of (i) a picture, (ii) an email, (iii) a first name, (iv) a last name, (v) a current location, (vi) marital status, (vii) gender, (viii) a family name, (ix) a hometown, and (x) date of birth. The family information includes one or more of family history, relationship information between family members, pictures, video or messages associated with the first user or the second user. The response includes a relationship between the first user and the second user.

In some embodiments, the one or more non-transitory computer-readable storage mediums storing the one or more sequences of instructions, which when executed by one or more processors, further causes generating a relationship path chart that includes the relationship between each family member of one or more of the first user or the second user using the machine learning model.

In some embodiments, the one or more non-transitory computer-readable storage mediums storing the one or more sequences of instructions, the pre-determined tree template includes at least one of father name and age, mother name and age, siblings name and age, maternal father name and age, maternal mother name and age, paternal father name and age or paternal mother name or age.

In some embodiments, the one or more non-transitory computer-readable storage mediums storing the one or more sequences of instructions, the pre-determined tree template determines the relationship between the first user and the second user, the pre-determined tree template includes a plurality of branches that expose the relationship between the first user and the second user The nodes will appeared in the family members profile to view another family members family tree.

In some embodiments, the one or more non-transitory computer-readable storage mediums storing the one or more sequences of instructions, which when executed by one or more processors, further causes enabling the first user or the second user to perform a plurality of actions that include inviting one or more family friend to join a corresponding family tree friends column in one or more of the first family tree or the second family tree and inviting one or more relative to join corresponding family tree relative column in one or more of the first family tree or the second family tree.

In some embodiments, the one or more non-transitory computer-readable storage mediums storing the one or more sequences of instructions, which when executed by one or more processors, further causes determining mutual users by processing the first family tree associated with the first user or the second family tree associated with the second user.

In some embodiments, the one or more non-transitory computer-readable storage mediums storing the one or more sequences of instructions, which when executed by one or more processors, further causes, further includes generating the matrimony recommendation to the family members in the first family tree or the second family tree, if the family members in the first family tree or the second family tree include at least one of (i) predetermined age (ii) unmarried marital status and (iii) opposite gender to unmarried family members of the family trees.

In another aspect, a system for generating a matrimony recommendation using a machine learning model based on a populated family tree is provided. The system includes a memory that stores a set of instructions and a processor that executes the set of instructions and is configured to (i) generate a user profile for at least one of (a) a first user or (b) a second user, (ii) obtain family information of (a) the first user from a first user device associated with the first user and (b) the second user from a second user device associated with the second user, (iii) generate a database using the family information associated with the first user and the second user, (iv) automatically generate (a) a first family tree using the family information associated with the first user, and (b) a second family tree using the family information associated with the second user based on a pre-determined tree template, (v) populate at least one of the first family tree or the second family tree based on a response from at least one of (a) the first user or (a) the second user and the family tree is populated by (a) automatically determining the relationship between family members of the first user and family members of the second user using one or more relationship rules based on the response from the first user or the second user (b) automatically determining a degree of relationship that includes at least one of a first degree of relationship, a second degree of relationship, or a third degree of relationship between the first user and the family members of the first user or the second user and the family members of the second user, (c) automatically populating the family tree with the determined degree of relationship between the first user and the family members of the second user and the relationship between the second user and the family members of the first user, (vi) train the machine learning model using the populated family based on the response from at least one of the first user or the second user and (vii) automatically fill the second family tree with common family members of the first family tree and the second family tree and, (viii) process a request from a new user to generate the matrimony recommendation to the new user using the machine learning model based on the marital status of the family members of at least one of the first user or the second user. The user profile comprises at least one of (i) a picture, (ii) an email, (iii) a first name, (iv) a last name, (v) a current location, (vi) marital status, (vii) gender, (viii) a family name, (ix) a hometown, and (x) date of birth. The family information includes at least one of family history, relationship information between family members, pictures, video or messages associated with the first user or the second user. The response comprises a relationship between the first user and the second user.

In some embodiments, generating a relationship path chart that comprises the relationship between each family member of one or more of the first user or the second user using the machine learning model.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 is a mock-up screenshot of a user interface view that illustrates generating a user profile of a user according to some embodiments herein;

FIG. 4 is a mock-up screenshot of a user interface view that illustrates creating a family name for the user according to some embodiments herein;

FIG. 8 is a mock-up screenshot of a user interface view that illustrates adding events in the family and inviting the family members according to some embodiments herein;

FIG. 9 is a mock-up screenshot of a user interface view that illustrates suggesting relatives to the family members according to some embodiments herein;

DETAILED DESCRIPTION OF PREFERRED EMBODIMENTS

Figure 1:
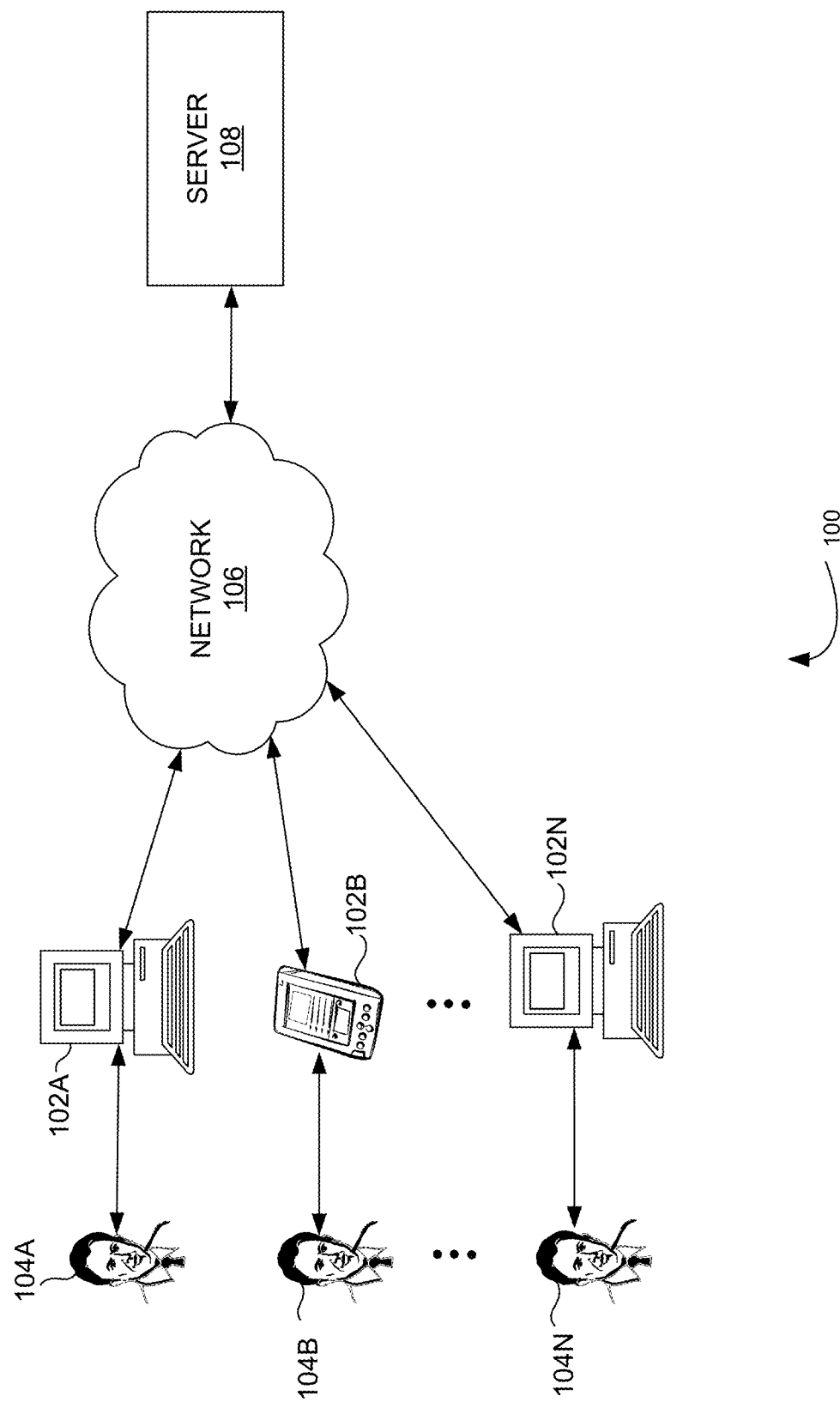
FIG. 1 is a block diagram that illustrates a system that generates a matrimony recommendation using a machine learning model based on a populated family tree according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for creating the family tree to connect the family members to know the relationship, history of the family members and to share the photos, videos and to organize the events and give a matrimony suggestion. Referring now to the drawings, and more particularly to FIGS. 1 through 13, where similar reference characters denote corresponding features consistently throughout the figures, there are shown preferred embodiments.

FIG. 1 is a block diagram 100 that illustrates a system that generates a matrimony recommendation using a machine learning model based on a populated family tree according to some embodiments herein. The block diagram 100 includes one or more user devices 102A-N associated with one or more users 104A-N, a network 106 and a server 108. The one or more user devices 102A-N communicates with the server 108 through the network 106. In some embodiments, the network 106 is a wired network. In some embodiments, the network 106 is a wireless network. In some embodiments, the network 106 is a combination of a wired network and a wireless network. In some embodiments, the network 106 is the Internet. In some embodiments, the one or more user devices 102A-N, without limitation, may be selected from a mobile phone, a Personal Digital Assistant (PDA), a tablet, a desktop computer, or a laptop.

The one or more user devices 102A-N receives inputs from the one or more users 104A-N and communicates the inputs received from the one or more users 104A-N to the server 108 via the network 106. The server 108 generates a user profile for each user 104A-N to create a family tree. In some embodiments, the user profile includes at least one of (i) a picture, (ii) an email, (iii) a first name, (iv) a last name, (v) a current location, (vi) a marital status, (vii) gender, (viii) a family name, (ix) a hometown, and (x) date of birth.

The server 108 obtains family information of each user 104A-N from a user device associated with each user 102A-N. In some embodiments, the family information includes at least one of family history, relationship information between family members, pictures, video or messages associated with each user 104A-N. In some embodiments, the family information may include first name, last name, father name, mother name, siblings name, occupation of each user 104A-N. The server 108 generates a database using the family information associated with each user 104A-N. The server 108 automatically generates family trees for each user 104A-N using the family information associated with each user 104A-N based on a pre-determined tree template. The server 108 populates the family tree members based on a response from each user 104A-N in the family tree. In some embodiments the response includes a relationship between each user 104A-N and the family members in each family tree.

In some embodiments, the response includes a relationship path. The server 108 populates the family tree by automatically determining the relationship between family members of each user 104A-N using one or more relationship rules based on the response from each user 104A-N. In some embodiments, the server 108 enables each user 104A-N to add the family members manually and invite through email. In some embodiments, the relationship between each user 104A-N is determined by comparing the family details includes father name, mother name, relatives. The server 108 populates the family tree by automatically determining a degree of relationship that includes at least one of (i) a first degree of relationship, (ii) a second degree of relationship, or (iii) a third degree of relationship between each user 104A-N and the family members of each user 104A-N. The first degree of relationship includes family members of the user, for example father, mother, spouse of the user. The second degree of relationship includes relatives of the user, for example spouse of user's sister or brother. The third degree of relationship includes family members of the relatives of the user, for example, father-in-law or mother-in-law of user's sister or brother.

The server 108 populates the family tree by automatically populates the family tree members with the determined degree of relationship between each user 104A-N and the family members of each user 104A-N. In some embodiments, the server 108 automatically fills the common family members in the family tree to another family tree. In some embodiments, the server 108 automatically fills the family tree with the family members of another family tree who are not the family members of the family tree.

The server 108 processes a request from a new user to generate the matrimony recommendation using the machine learning model. In some embodiments, matrimony recommendation includes a picture, age, relationship path, marital status, the family information, and family status of each user 104A-N.

Figure 2:
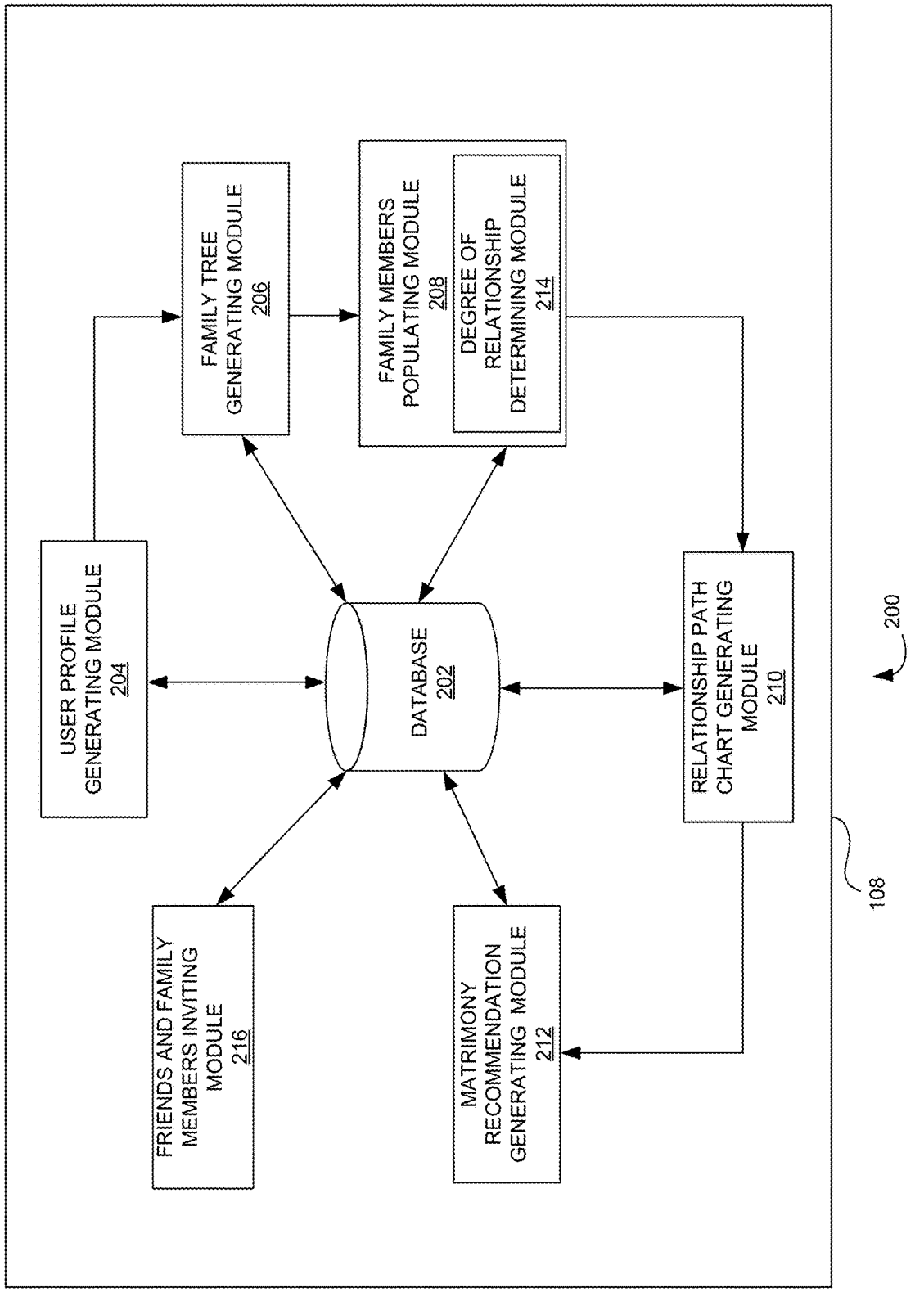
FIG. 2 is a block diagram of a server of FIG. 1 according to some embodiments herein.

FIG. 2 is a block diagram 200 of the server 108 of FIG. 1 according to some embodiments herein. The server 108 includes a database 202, a user profile generating module 204, a family tree generating module 206, family members populating module 208, a relationship path chart generating module 210, a matrimony recommendation generating module 212 and a friends and family members inviting module 216. The family members populating module 208 includes a degree of relationship determining module 214. The user profile generating module 204 generates a user profile for a first user 104A or a second user 104B. The user profile includes at least one of (i) a picture, (ii) an email, (iii) a first name, (iv) a last name, (v) a current location, (vi) marital status, (vii) gender, (viii) a family name, (ix) a hometown, and (x) date of birth.

The family tree generating module 206 obtains family information of (i) the first user 104A from a first user device 102A associated with the first user 104A and (ii) the second user 104B from a second user device 102B associated with the second user 104B. The family information includes at least one of family history, relationship information between family members, pictures, video or messages associated with the first user 104A or the second user 104B. The family tree generating module 206 generates the database 202 using the family information associated with the first user 104A and the second user 104B. The family tree generating module 206 automatically generates (i) a first family tree using the family information associated with the first user 104A, and (ii) a second family tree using the family information associated with the second user 104B based on a pre-determined tree template. The family members populating module 208 populates family members of (i) the first family tree or (ii) the second family tree based on a response from at least one of (i) the first user 104A or (ii) the second user 104B. The response includes a relationship between the first user 104A and the second user 104B. The degree of relationship determining module 214 automatically determines the relationship between the family members of the first user 104A and the family members of the second user 104B using one or more relationship rules based on the response from the first user 104A or the second user 104B. The relationship between the family members of at least one of the first user 104A or the second user 104B is determined by comparing the family information of the first user 104A with the family information of the second user 104B. The degree of relationship determining module 214 automatically determines a degree of relationship that includes at least one of (i) a first degree of relationship, (ii) a second degree of relationship, or (iii) a third degree of relationship between the first user 104A and the family members of the first user 104A or the second user 104B and the family members of the second user 104B. The family members populating module 208 populates automatically populates the family tree members with the determined degree of relationship between the first user 104A and the family members of the second user 104B and the relationship between the second user 104B and the family members of the first user 104A. The family members populating module 208 trains the machine learning model using the populated family tree based on the response from at least one of the first user 104A or the second user 104B. The matrimony recommendation generating module 212 processes a request from a new user to generate the matrimony recommendation using the machine learning model based on the marital status of the family members of at least one of the first user 104A or the second user 104B. In some embodiments, the matrimony recommendation generating module 212 generates the matrimony recommendation to the family members in the first family trees, if the family members in the family trees include at least one of (i) predetermined age (ii) unmarried marital status and (iii) opposite gender to unmarried family members of the family trees.

The relationship path chart generating module 210 generates a relationship path chart that includes the relationship between each family member of at least one of the first user 104A or the second user 104B using the machine learning model. The friends and family members inviting module 216 enables the first user 104A or the second user 104B to perform one or more actions that including inviting at least one family friend to join a corresponding family tree friends column in at least one of the first family tree or the second family tree and inviting at least one relative to join corresponding family tree relative column in at least one of the first family tree or the second family tree.

Figure 3:
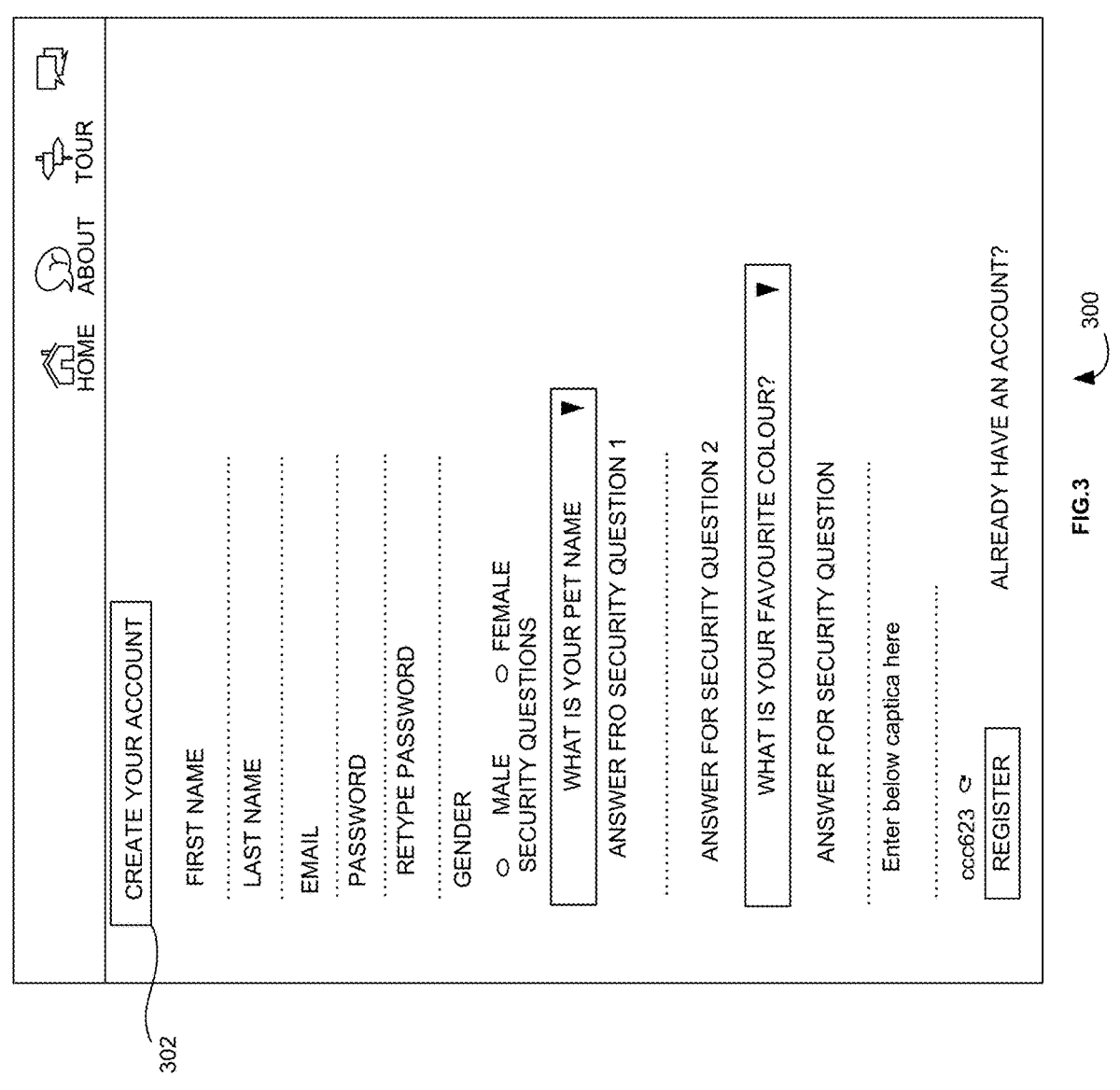

FIG. 3 is a mock-up screenshot of a user interface view 300 that illustrates generating a user profile of a user according to some embodiments herein. The user may create a profile/account using create your account 302. The user may provide information such as first name, last name, email, password, gender and security questions.

FIG. 4 is a mock-up screenshot of a user interface view 400 that illustrates creating a family name for a user according to some embodiments herein. The user may provide a first name, a last name, a current location, marital status, gender, family name, home town, date of birth of the user for generating the family tree for the user. The user may create the name of the family tree to add relatives to the family tree and to identify the family tree using family name 402.

Figure 5:
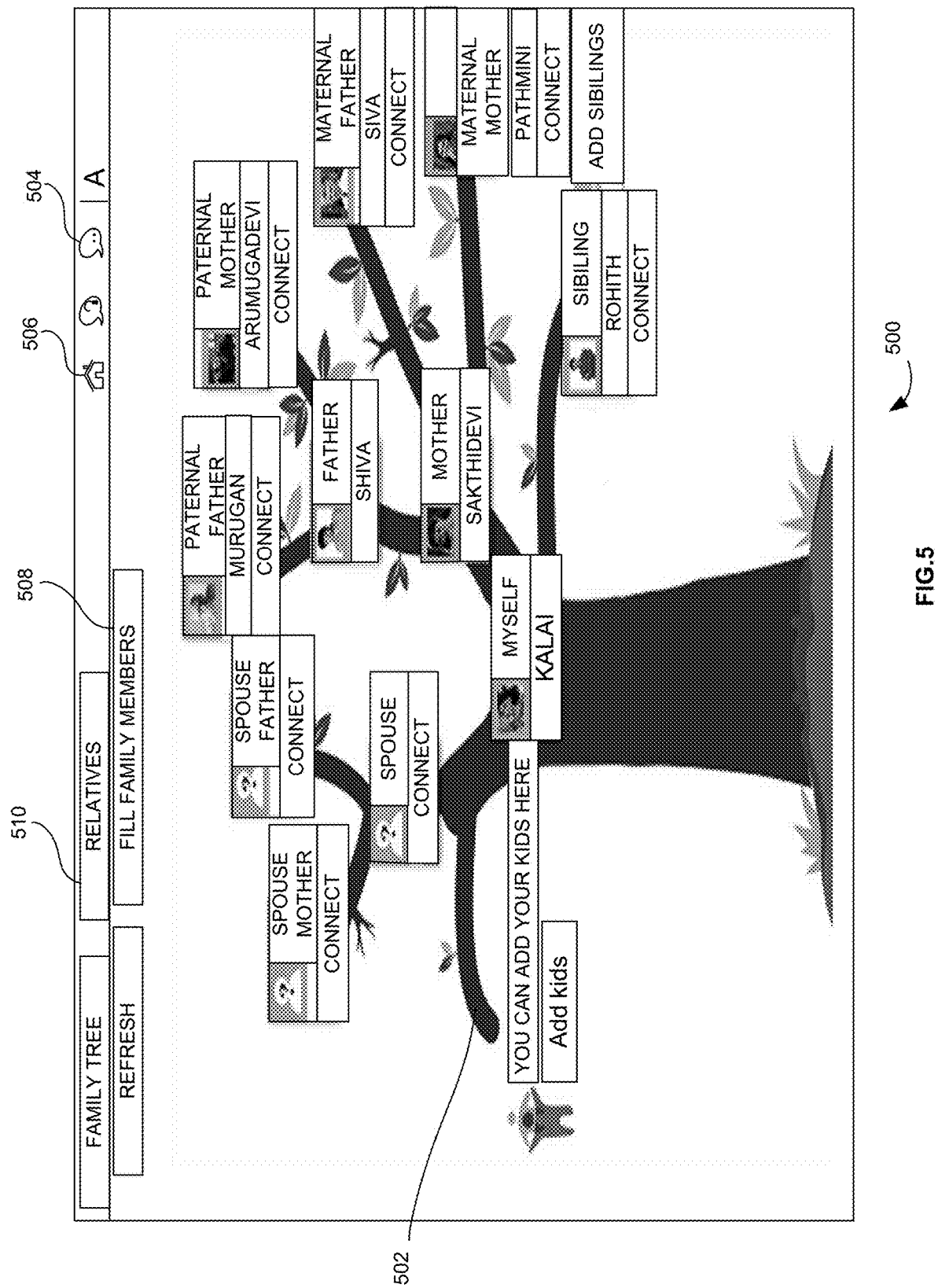
FIG. 5 is a mock-up screenshot of a user interface view that illustrates the family tree according to some embodiments herein.

FIG. 5 is a mock-up screenshot of a user interface view 500 that illustrates a family tree 502 according to some embodiments herein. The user interface view 500 depicts the family tree 502 that includes family members and relatives of a user. The user may add the relatives in the family tree 502 using relatives 510. The user may access the options available in-home page and view status of the users in the family tree by selecting Home option 506. In some embodiments, the user may fill the family members of a first family tree to a second family tree using fill family members 508. The user may send a message to the family members using a message 504. The user may invite the family members to join the family tree 502 through email and search details in a website directly.

Figure 6:
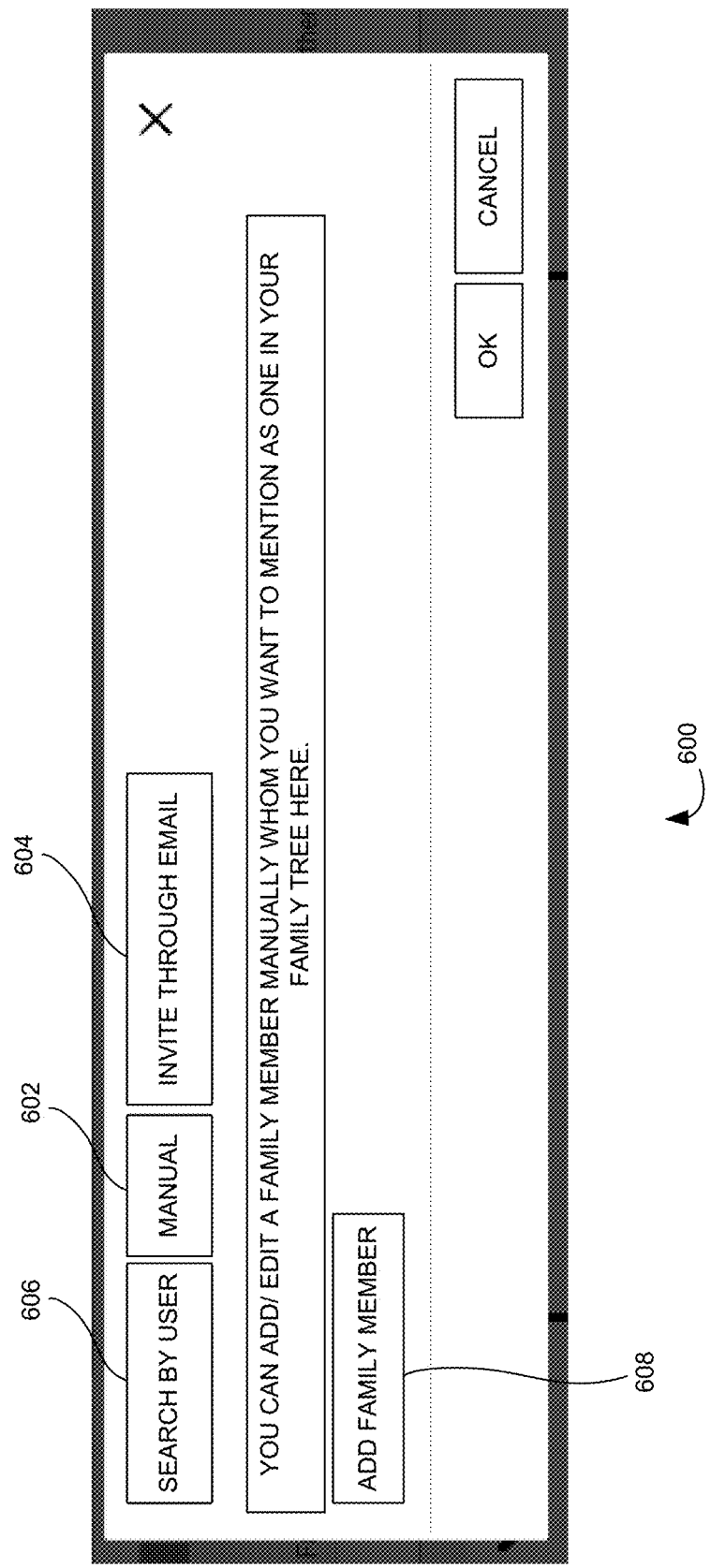
FIG. 6 is a mock-up screenshot of a user interface view that illustrates inviting family members manually according to some embodiments herein.

FIG. 6 is a mock-up screenshot of a user interface view 600 that illustrates inviting family members manually according to some embodiments herein. A user may select manual 602 to search the family members manually to add the family members to a family tree. The user may select invite through email 604 to invite users to join the family tree. In some embodiments, the email may include the invitation to join. The user may select search by user 606 to search the family members manually. The user may select add family members 608 to add the family members to the family tree.

Figure 7:
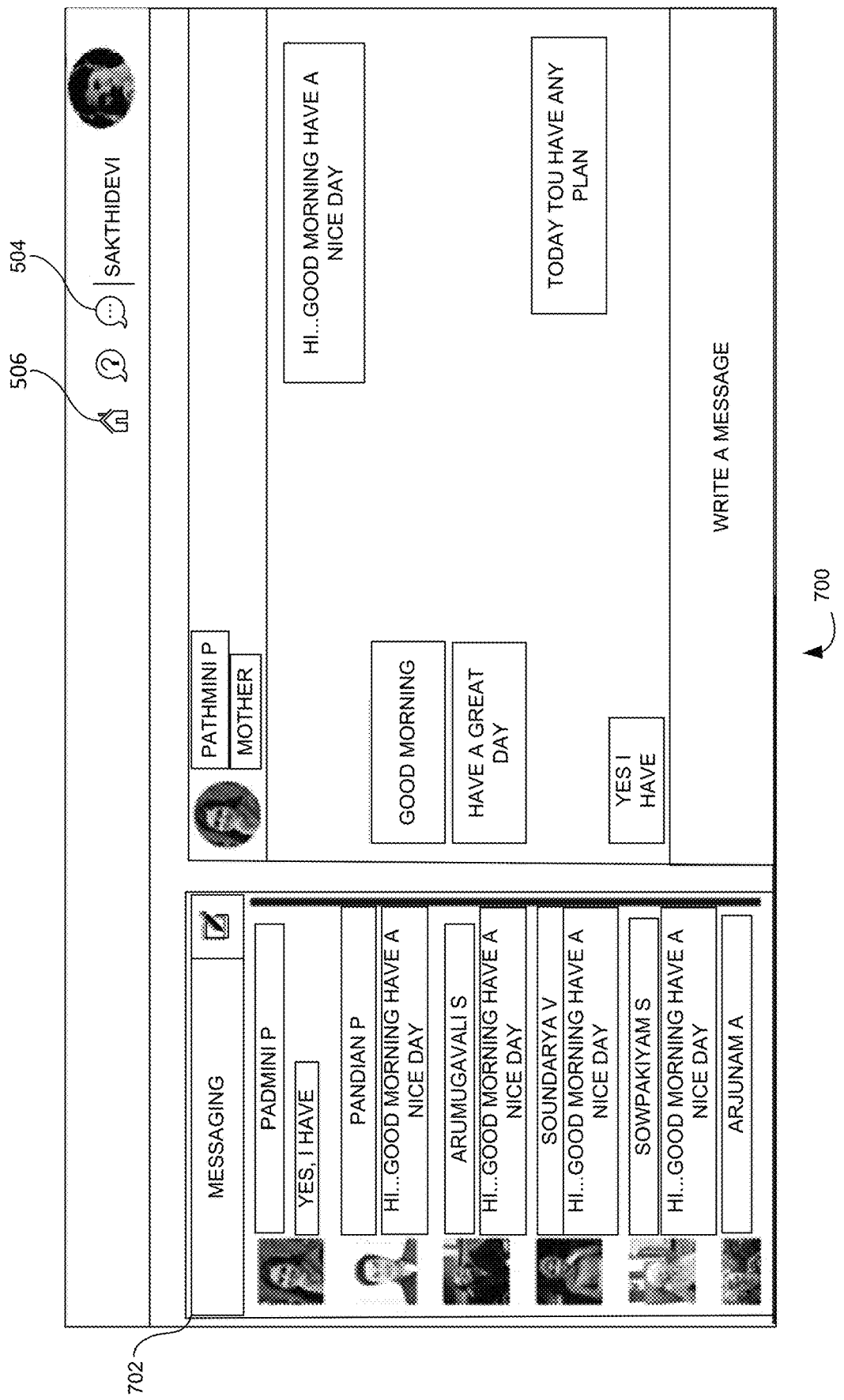
FIG. 7 is a mock-up screenshot of a user interface view that illustrates enabling the user to communicate with the family members in the family tree according to some embodiments herein.

FIG. 7 is a mock-up screenshot of a user interface view 700 that illustrates enabling a user to communicate with family members in a family tree according to some embodiments herein. The user may send a message to the family members in the family tree using message box 702. The user may access the options available in-home page and view the status of the users in the family tree by selecting the Home option 506.

FIG. 8 is a mock-up screenshot of a user interface view 800 that illustrates adding events in a family and inviting family members according to some embodiments herein. A user may select add events 802 to add events, e.g. birthday celebration, wedding invitation of the family members. The user may post the events using family events 804 at a corresponding user profile. In some embodiments, the user may post photos or videos of the corresponding events at the user profile.

Figure 9:
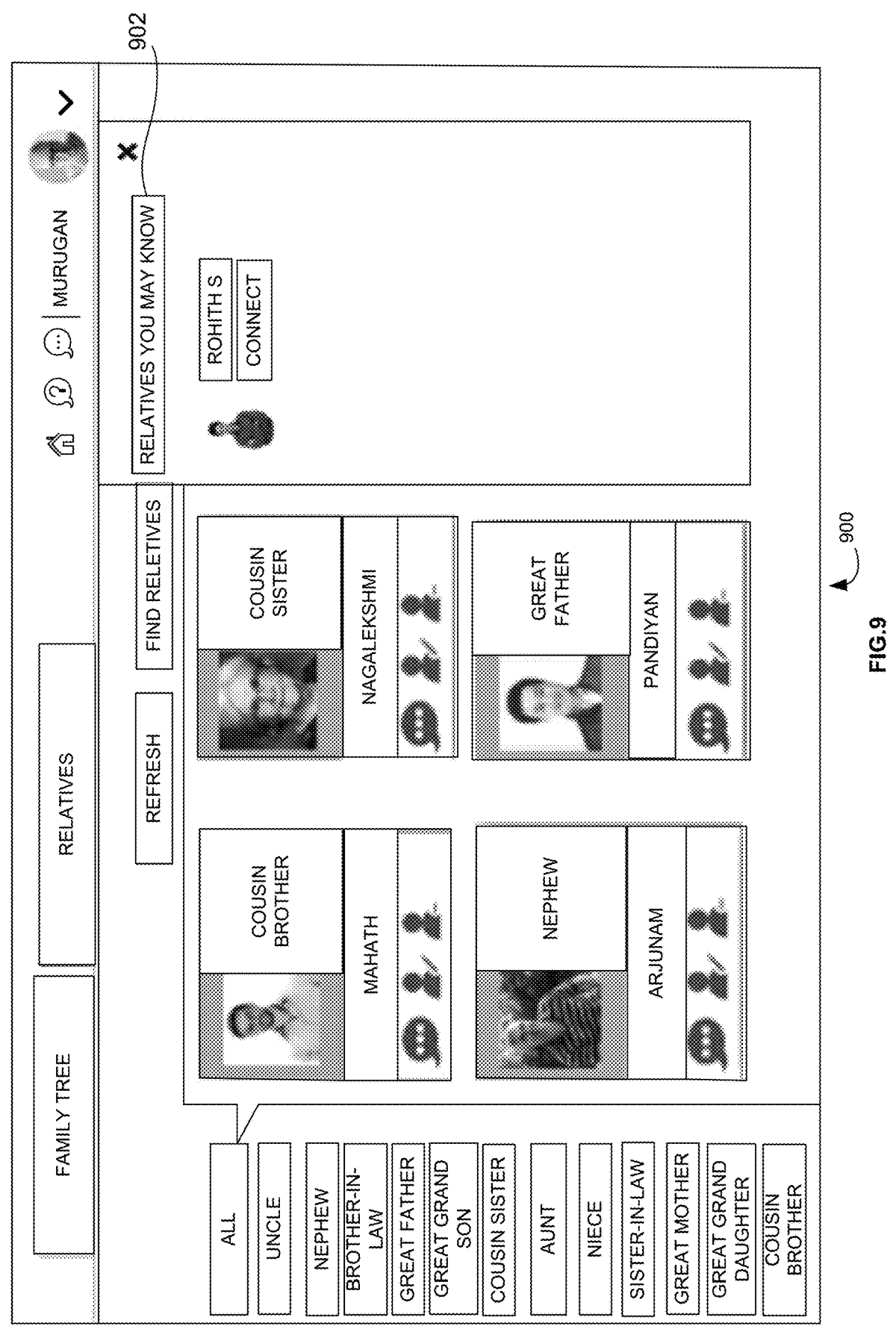

FIG. 9 is a mock-up screenshot of a user interface view 900 that illustrates suggesting relatives 902 to family members according to some embodiments herein. In some embodiments, the user interface view 900 depicts that the relatives are suggested to a user. The user may add the relatives to the family tree.

Figure 10A:
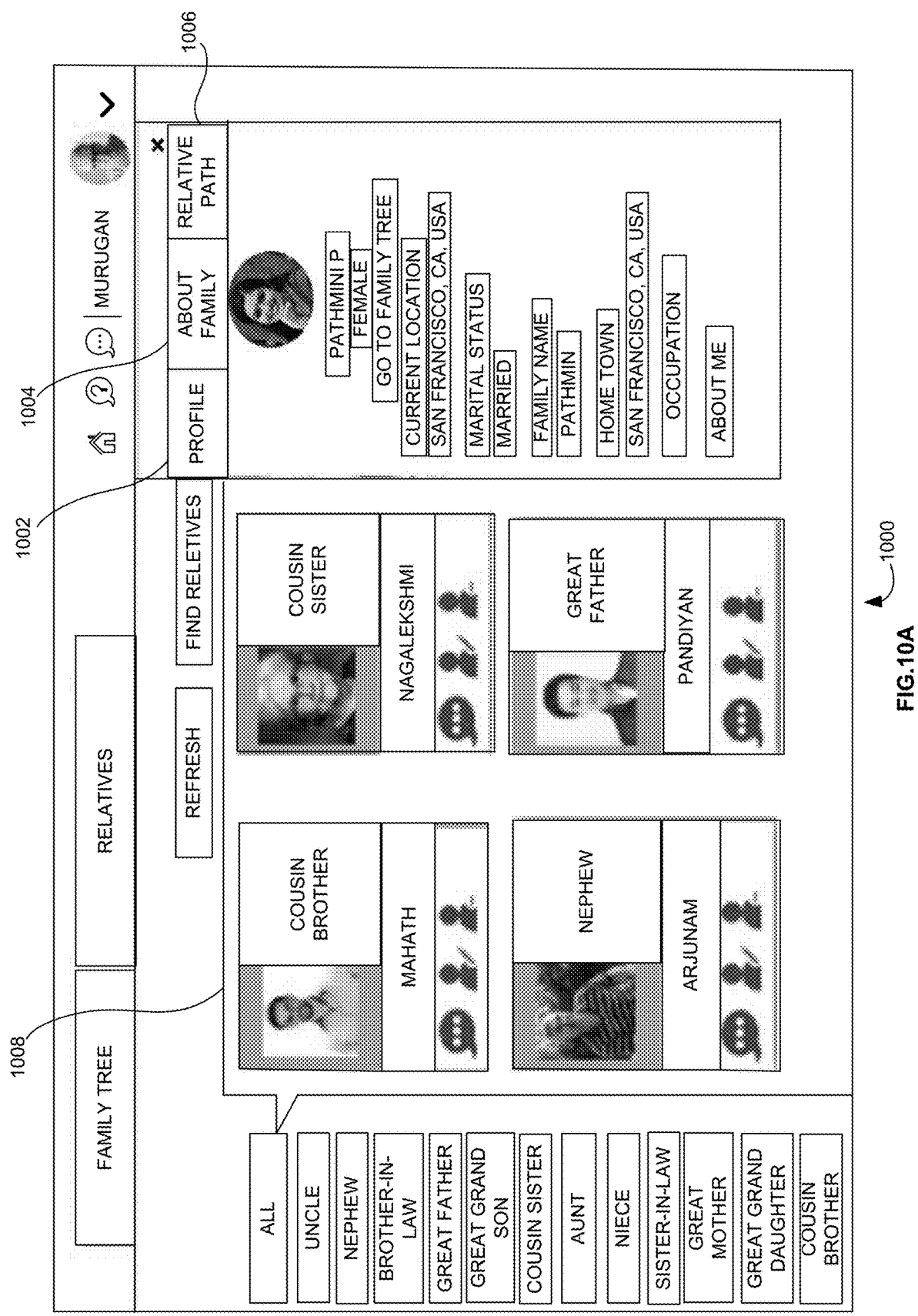
FIG. 10A is a mock-up screenshot of a user interface view that illustrates showing the relatives family tree according to some embodiments herein.

FIG. 10A is a mock-up screenshot of a user interface view 1000 that illustrates showing relative's family tree according to some embodiments herein. The user may select a profile 1002 to view the profile of a suggested family member in a family tree. In some embodiments, the profile 1002 includes location, family details, marital status, home town, occupation. The user may select about family 1004 to know family history and family tree details of the suggested relative. The user may select relative path 1006 to know about relationship between the user and the suggested relative.

Figure 10B:
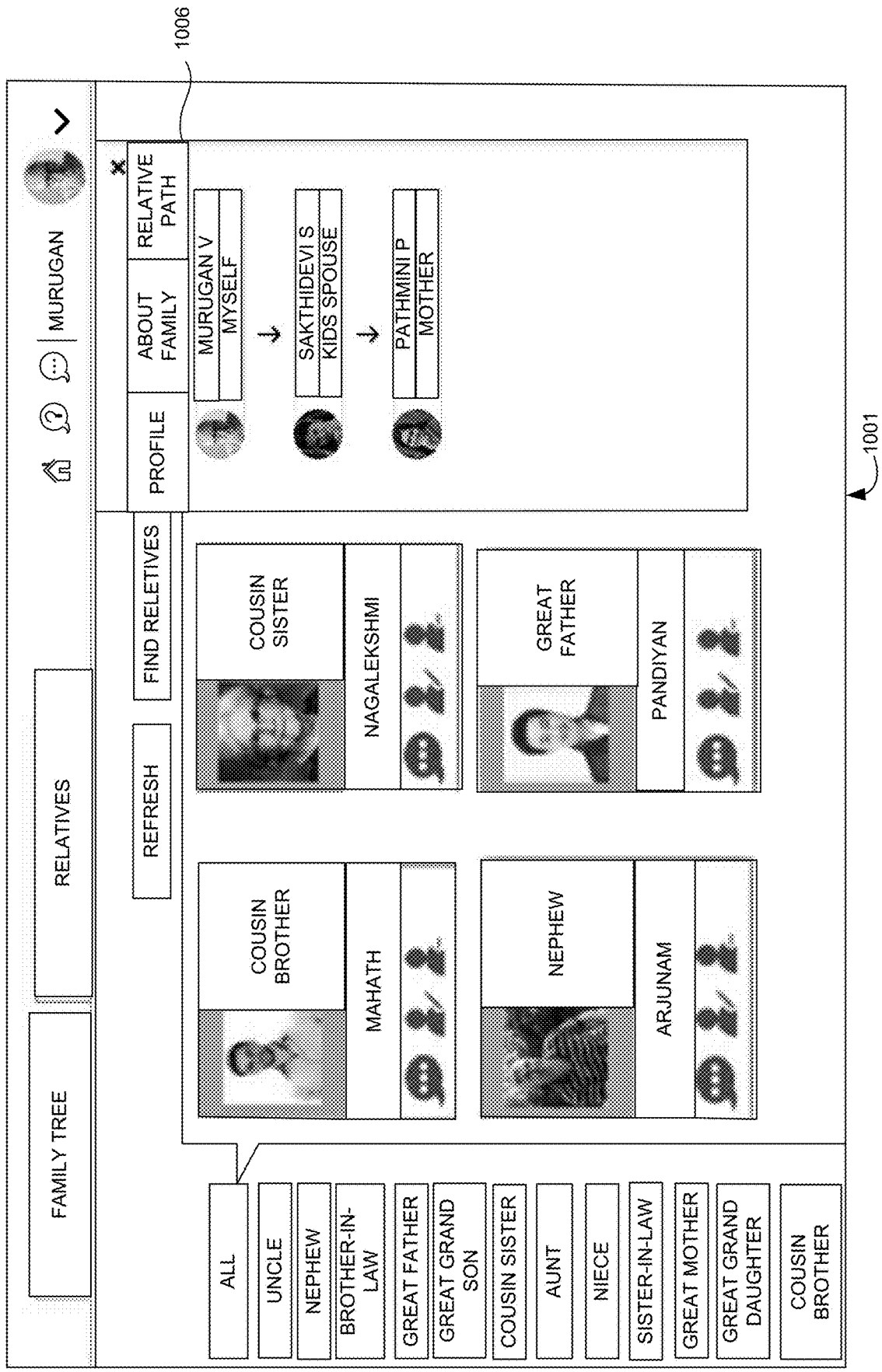
FIG. 10B is a mock-up screenshot of a user interface view that illustrates showing a relative path of each member in the family tree according to some embodiments herein.

FIG. 10B is a mock-up screenshot of a user interface view 1101 that illustrates showing the relative path 1006 of each member in a family tree according to some embodiments herein. A user may select the relative path 1006 to know the relationship with the suggested family member and the user. The user may view the relatives of the suggested family member.

Figure 10C:
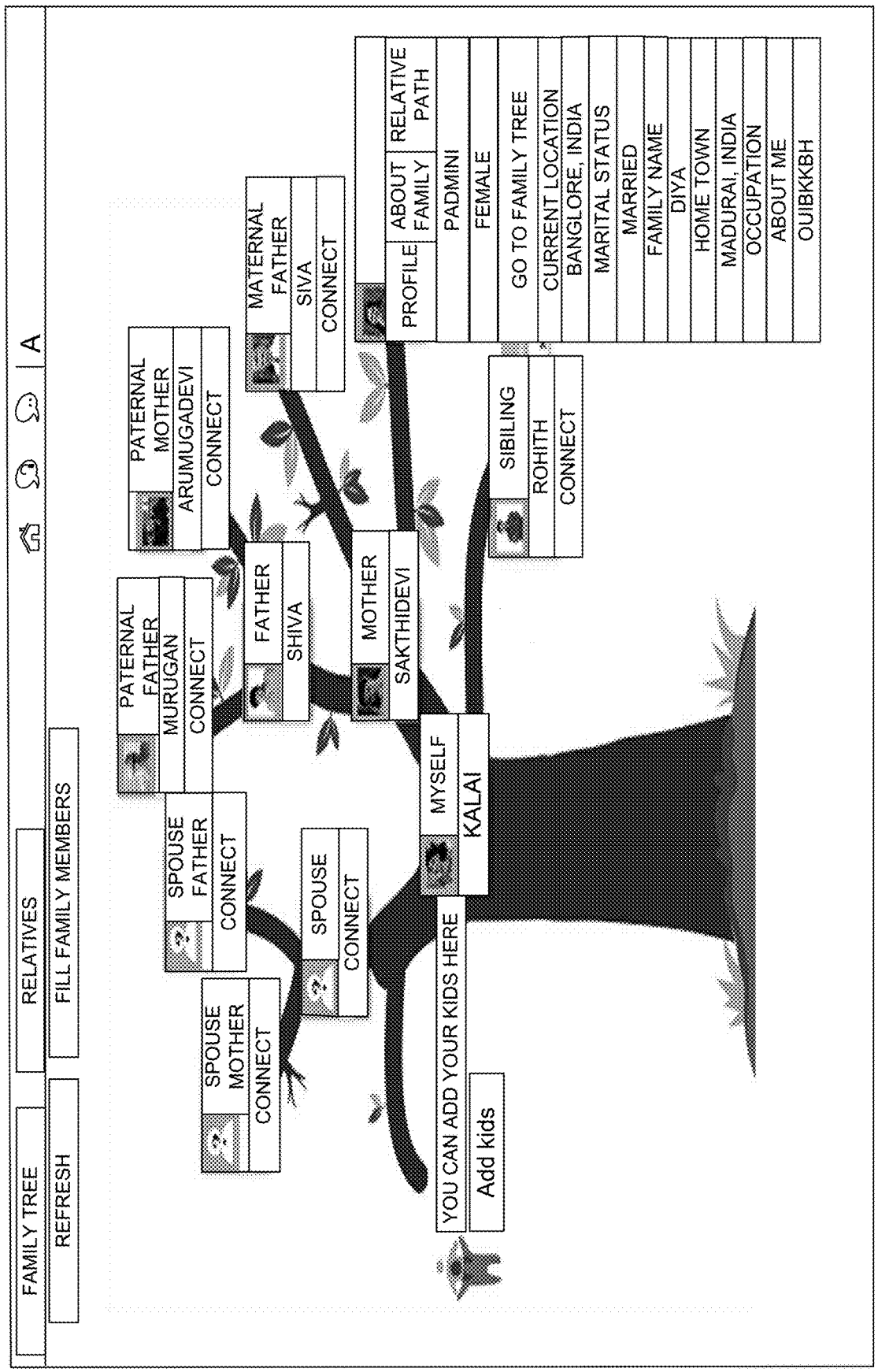
FIG. 10C is a mock-up screenshot of a user interface view that illustrates showing relatives of the suggested family members the family tree according to some embodiments herein.

FIG. 10C is a mock-up screenshot of a user interface view that illustrates showing information associated with family members of a family tree according to some embodiments herein. A user may select 'Go To Family Tree' in the family member's profile to view details associated with the of the family member's along with a family tree of the family member. In some embodiments, the user may select a 'Go To Family Tree' to view at least one of first-degree relatives, second-degree relatives or third-degree relative of family member. In some embodiments, the relatives of the family members are displayed as a suggestion along with their details for the user. In some embodiments, when the user selects go to family tree, the family tree of the family member is displayed on a user device associated with a user. In some embodiments, the relatives may be Spouse, Father in Law, Mother in Law, Kids and Grand Kids.

Figure 11:
FIG. 11 is a mock-up screenshot of a user interface view that illustrates showing a matrimony suggestion to family members of a user according to some embodiments herein.

FIG. 11 is a mock-up screenshot of a user interface view 1100 that illustrates showing a matrimony suggestion to family members of a user according to some embodiments herein. The family members of the user may select See My Partner 1102 to enable the matrimony suggestion. The family member of the user may view suggested partners from the different family trees. In some embodiments, if the family member of the user may determine preferences for the matrimony suggestion.

Figure 12:
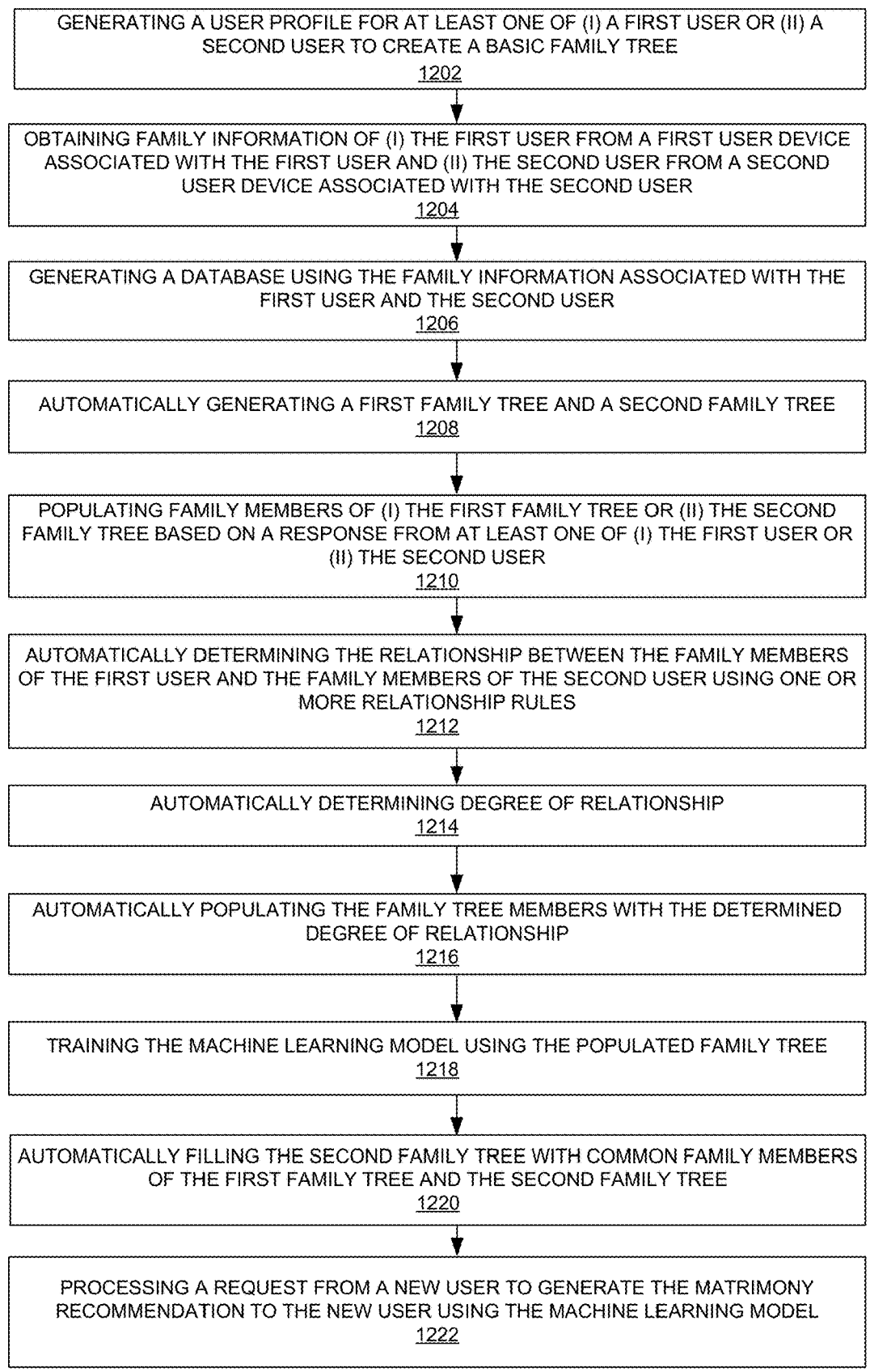
FIG. 12 is a flow diagram that illustrates a method for generating a matrimony recommendation using a machine learning model based on a populated family tree according to some embodiments herein.

FIG. 12 is a flow diagram that illustrates a method 1200 for generating a matrimony recommendation using a machine learning model based on a populated family tree according to some embodiments herein. At step 1202, the method 1200 includes generating a user profile for at least one of (i) the first user 104A or (ii) the second user 104B. At step 1204, the method 1200 includes obtaining family information of (i) the first user from a first user device associated with the first user and (ii) the second user from a second user device associated with the second user. At step 1206, the method 1200 includes generating a database using the family information associated with the first user 104A and the second user 104B. At step 1208, the method 1200 includes automatically generating a first family tree and second family tree. At step 1210, the method 1200 includes populating family members of (i) the first family tree or (ii) the second family tree based on a response from at least one of (i) the first user 104A or (ii) the second user 104B. At step 1212, the method 1200 includes automatically determining the relationship between family members of the first user 104A and family members of the second user 104B using one or more relationship rules based on the response from the first user 104A or the second user 104B. At step 1214, the method 1200 includes automatically determining degree of relationship between that includes at least one of (i) a first degree of relationship, (ii) a second degree of relationship, or (iii) a third degree of relationship between the first user 104A and the family members of the first user 104A or the second user 104B and the family members of the second user 104B. At step 1216, the method 1200 includes automatically populating the family tree members with the determined degree of relationship between the first user 104A and the family members of the second user 104B and the relationship between the second user 104B and the family members of the first user 104A. At step 1218, the method 1200 includes training the machine learning model using the populated family tree based on the response from at least one of the first user 104A or the second user 104B. At step 1220, the method 1200 includes automatically filling the second family tree with common family members of the first family tree and the second family tree. At step 1222, the method 1200 includes processing a request from a new user to generate the matrimony recommendation to the new user using the machine learning model based on the marital status of the family members of at least one of the first user 104A or the second user 104B.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 13:
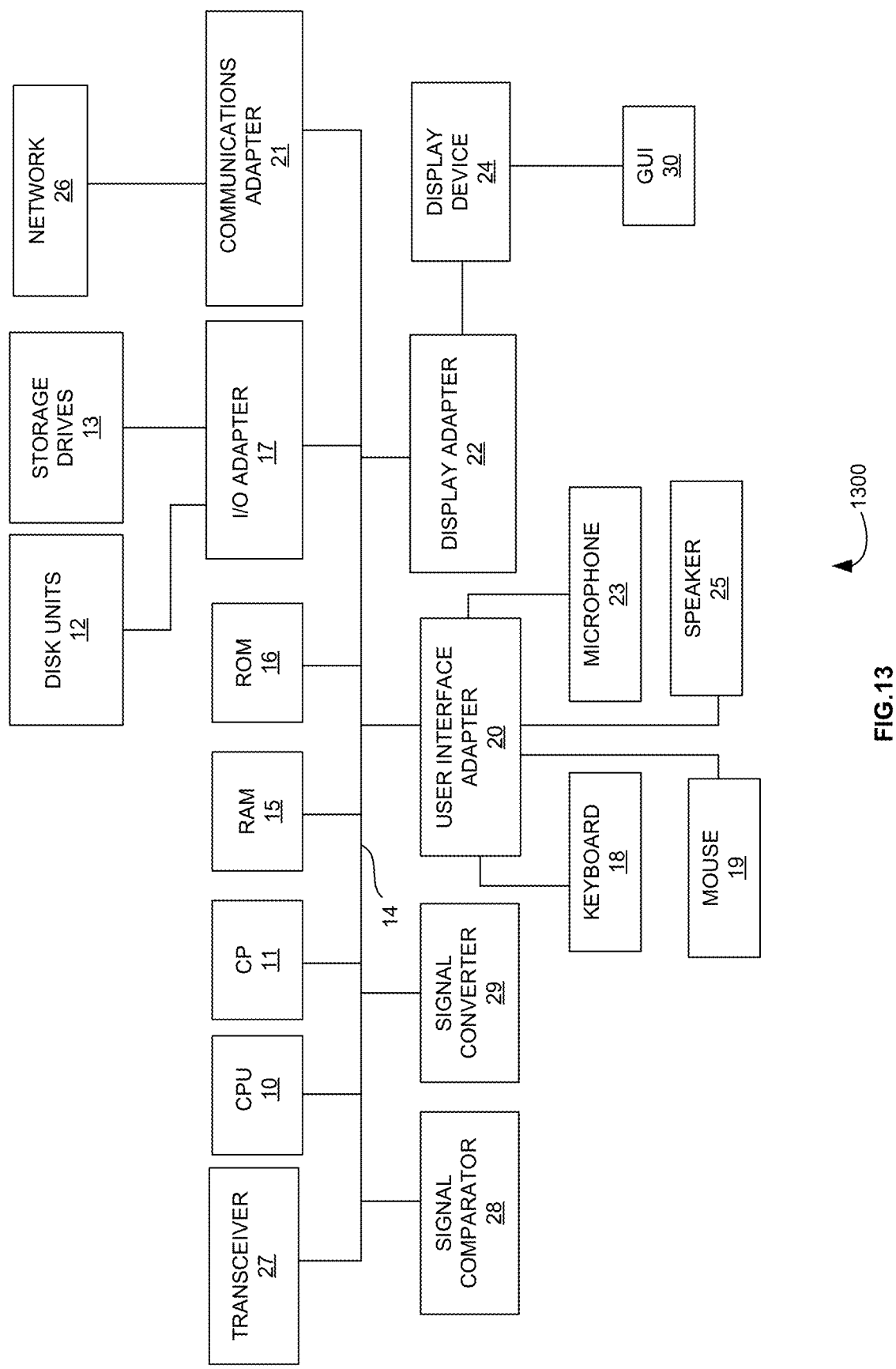
FIG. 13 is a block diagram of a schematic diagram of a device used in accordance with embodiments herein.

A representative hardware environment for practicing the embodiments herein is depicted in FIG. 13, with reference to FIGS. 1 through 12. This schematic drawing illustrates a hardware configuration of a server/computer system/user device in accordance with the embodiments herein. The user device includes at least one processing device 10 and a cryptographic processor 11. The special-purpose CPU 10 and the cryptographic processor (CP) 11 may be interconnected via system bus 14 to various devices such as a random-access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device can read the inventive instructions on the program storage devices and follow these instructions to execute the methodology of the embodiments herein. The user device further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for generating a family network by creating a family tree for a user and connecting family members of the user with the family network of other users and generating matrimony recommendations based on relationships, the method comprising:

obtaining family information associated with a first user and a second user, wherein the family information of the first user is obtained from a first user device and the family information of the second user is obtained from a second user device, wherein the family information comprises family history, and relationship information between family members associated with the first user and the second user, wherein the first user is a family member of the second user, wherein the family member is one of a father, mother, spouse, son, daughter siblings, maternal father, maternal mother, paternal father, paternal mother, father-in-law, mother-in-law, grandson and granddaughter;

generating a first family tree for the first user and a second family tree for the second user based on the family information using a pre-determined tree template, wherein the pre-determined tree template comprises a plurality of branches that expose the relationship between the first user and family members of the first user, the second user and family members of the second user, wherein the first user is enabled to view family trees of family members in the first family tree, wherein the second user is enabled to view family trees of family members in the second family tree, wherein each user have their version of family tree, wherein the first user is enabled to invite the second user and add the second user to the first family tree of the first user and the second user is enabled to invite the first user and add the first user to the second family tree of the second user;

automatically identifying family members and relatives in the first family tree of the first user and the second family tree of the second user using a machine learning model to (i) automatically add identified family members of the first family tree of the first user in the second family tree of the second user, wherein the identified family members are common to the first user and the second user's family tree; and (ii) automatically suggest identified relatives to the first user and the second user, wherein the identified relatives are not common to the first user and the second user's family tree, wherein the machine learning model identifies family members and relatives in the first family tree of the first user and the second family tree of the second user based on a degree of relationship that comprises (i) a first degree of relationship comprising family members, (ii) a second degree of relationship comprising relatives, and (iii) a third degree of relationship that comprises family members of the relatives; and generating matrimony recommendation to the first user or the second user using the machine learning model based on a request from the first user or the second user, wherein the matrimony recommendation is provided based on the third degree of relationship between family members of the first user and the second user, wherein the third degree of relationship comprises family members of relatives of the first user and the second user.

2. The processor-implemented method of claim 1, further comprises automatically generating a relationship path chart between each family member of the first user in the first family tree and the second user in the second family tree using the machine learning model, wherein the relationship path chart shows how the first user and second user are related to each other.

3. The processor-implemented method of claim 1, wherein the pre-determined tree template further comprises family members of sons and daughters of the user.

4. The processor-implemented method of claim 3, wherein the matrimony recommendation is generated based on profile data and preferences of the first user or the second user, wherein the profile data comprises at least one a picture, an email, first name, last name, current location, marital status, gender, family name, hometown, date of birth, occupation and age.

5. The processor-implemented method of claim 1, further comprising enabling the first user or the second user to post a family event and send an invite to the identified family members, and the identified relatives using the machine learning model for the family event.

6. The processor-implemented method of claim 1, wherein the first user and the second user are connected by comparing the family information of the first user obtained from the first user's device and the family information of the second user obtained from the second user's device using relationship rules that define how the first user is related to the second user.

7. The processor-implemented method of claim 1, wherein the method further comprises enabling the first user or the second user to view family trees of members in the family network who showed matrimonial interest after getting recommendations by the machine learning model.

8. One or more non-transitory computer-readable storage mediums storing one or more sequences of instructions, which when executed by one or more processors, further causes a method for generating a family network by creating a family tree for a user and connecting family members of the user with the family network of other user and generating matrimony recommendations based on relationships, the processor-implemented method comprising:

obtaining family information associated with a first user and a second user, wherein the family information of the first user is obtained from a first user device and the family information of the second user is obtained from a second user device, wherein the family information comprises family history, and relationship information between family members associated with the first user and the second user, wherein the first user is a family member of the second user, wherein the family member is one of a father, mother, spouse, son, daughter siblings maternal father, maternal mother, paternal father, paternal mother, father-in-law, mother-in-law, grandson and granddaughter;

generating a first family tree for the first user and a second family tree for the second user based on the family information using a pre-determined tree template, wherein the pre-determined tree template comprises a plurality of branches that expose the relationship between the first user and family members of the first user, the second user and family members of the second user, wherein the first user is enabled to view family trees of family members in the first family tree, wherein the second user is enabled to view family trees of family members in the second family tree, wherein each user have their version of family tree, wherein the first user is enabled to invite the second user and add the second user to the first family tree of the first user and the second user is enabled to invite the first user and add the first user to the second family tree of the second user;

automatically identifying family members and relatives in the first family tree of the first user and the second family tree of the second user using a machine learning model to (i) automatically add identified family members of the first family tree of the first user in the second family tree of the second user, wherein the identified family members are common to the first user and the second user's family tree; and (ii) automatically suggest identified relatives to the first user and the second user, wherein the identified relatives are not common to the first user and the second user's family tree, wherein the machine learning model identifies family members and relatives in the first family tree of the first user and the second family tree of the second user based on a degree of relationship that comprises (i) a first degree of relationship comprising family members, (ii) a second degree of relationship comprising relatives, and (iii) a third degree of relationship that comprises family members of the relatives; and generating matrimony recommendation to the first user or the second user using the machine learning model based on a request from the first user or the second user, wherein the matrimony recommendation is provided based on the third degree of relationship between the family members of the first user and the second user, wherein the third degree of relationship comprises family members of relatives of the first user and the second user.

9. The one or more non-transitory computer-readable storage mediums storing the one or more sequences of instructions of claim 8, which when executed by one or more processors, further causes automatically generating a relationship path chart between each family member of the first user in the first family tree and the second user in the second family tree using the machine learning model, wherein the relationship path chart shows how the first user and second user are related to each other.

10. The one or more non-transitory computer-readable storage mediums storing the one or more sequences of instructions of claim 8, wherein the pre-determined tree template further comprises family members of sons and daughters of the user.

11. The one or more non-transitory computer-readable storage mediums storing the one or more sequences of instructions of claim 10, wherein the matrimony recommendation is generated based on profile data and preferences of the first user and the second user, wherein the profile data comprises at least one a picture, an email, first name, last name, current location, marital status, gender, family name, hometown, date of birth, occupation and age.

12. The one or more non-transitory computer-readable storage mediums storing the one or more sequences of instructions of claim 8, which when executed by one or more processors, further causes enabling the first user or the second user to post a family event and send an invite to the identified family members, and the identified relatives using the machine learning model for the family event.

13. The one or more non-transitory computer-readable storage mediums storing the one or more sequences of instructions of claim 8, wherein the first user and the second user are connected by comparing the family information of the first user obtained from the first user's device and the family information of the second user obtained from the second user's device using relationship rules that define how the first user is related to the second user.

14. The one or more non-transitory computer-readable storage mediums storing the one or more sequences of instructions of claim 8, wherein the method further comprises enabling the first user or the second user to view family trees of members in the family network who showed matrimonial interest after getting recommendations by the machine learning model.

15. A system for generating a family network by creating a family tree for a user and connecting family members of the user with the family network of other user and generating matrimony recommendations based on relationships, the system comprising: a memory that stores a set of instructions; and a processor that executes the set of instructions and is configured to: obtain family information associated with a first user and a second, wherein the family information of the first user is obtained from a first user device and the family information of the second user is obtained from a second user device, wherein the family information comprises family history, and relationship information between family members associated with the first user and the second user, wherein the first user is a family member of the second user, wherein the family member is one of a father, mother, spouse, son, daughter siblings maternal father, maternal mother, paternal father, paternal mother, father-in-law, mother-in-law, grandson and granddaughter; generate a first family tree for the first user and a second family tree for the second user based on the family information using a pre-determined tree template, wherein the pre-determined tree template comprises a plurality of branches that expose the relationship between the first user and family members of the first user, the second user and family members of the second user, wherein the first user is enabled to view family trees of family members in the first family tree, wherein the second user is enabled to view family trees of family members in the second family tree, wherein each user will have their version of family tree, wherein the first user is enabled to invite the second user and add the second user to the first family tree of the first user and the second user is enabled to invite the first user and add the first user to the second family tree of the second user; automatically identify family members and relatives in the first family tree of the first user and the second family tree of the second user using a machine learning model to (i) automatically add identified family members of the first family tree of the first user in the second family tree of the second user, wherein the identified family members are common to the first user and the second user's family tree; and (ii) automatically suggest identified relatives to the first user and the second user, wherein the identified relatives are not common to the first user and the second user's family tree, wherein the machine learning model identifies family members and relatives in the first family tree of the first user and the second family tree of the second user based on a degree of relationship that comprises (i) a first degree of relationship comprising family members, (ii) a second degree of relationship comprising relatives, (iii) a third degree of relationship that comprises family members of the relatives; and generate matrimony recommendation to the first user or the second user using the machine learning model based on a request from the first user or the second user, wherein the matrimony recommendation is provided based on the third degree of relationship between family members of the first user and the second user, wherein the third degree of relationship comprises family members of relatives of the first user or the second user.

16. The system of claim 15, wherein a relationship path chart between each family member of the first user in the first family tree and the second user in the second family tree using the machine learning model, wherein the relationship path chart shows how the first user and second user are related to each other.

* * * * *